(12) United States Patent
Jang et al.

(10) Patent No.: US 10,880,475 B2
(45) Date of Patent: Dec. 29, 2020

(54) VIDEO CONVERSION APPARATUS AND SYSTEM FOR GENERATING 360-DEGREE VIRTUAL REALITY VIDEO IN REAL TIME

(71) Applicant: KOREA ELECTRONICS TECHNOLOGY INSTITUTE, Seongnam-si (KR)

(72) Inventors: Junhwan Jang, Goyang-si (KR); Woochool Park, Incheon (KR); Youngwha Kim, Seoul (KR); Jinwook Yang, Goyang-si (KR); Sangpil Yoon, Seoul (KR); Hyunwook Kim, Goyang-si (KR); Eunkyung Cho, Gyeonggi-do (KR); Minsu Choi, Seoul (KR); Junsuk Lee, Seoul (KR); Jaeyoung Yang, Seoul (KR)

(73) Assignee: KOREA ELECTRONICS TECHNOLOGY INSTITUTE, Seongnam-Si (KR)

(*) Notice: Subject to any disclaimer, the term of this patent is extended or adjusted under 35 U.S.C. 154(b) by 0 days.

(21) Appl. No.: 16/713,696

(22) Filed: Dec. 13, 2019

(65) Prior Publication Data
US 2020/0137305 A1 Apr. 30, 2020

Related U.S. Application Data

(63) Continuation of application No. PCT/KR2018/014569, filed on Nov. 23, 2018.

(30) Foreign Application Priority Data

Oct. 25, 2018 (KR) ........................ 10-2018-0128195

(51) Int. Cl.
*H04N 5/232* (2006.01)
*H04N 5/77* (2006.01)
(Continued)

(52) U.S. Cl.
CPC ........... *H04N 5/23238* (2013.01); *H04N 5/77* (2013.01); *H04N 19/436* (2014.11); *H04N 19/597* (2014.11)

(58) Field of Classification Search
CPC ............ H04N 5/23238; H04N 19/436; H04N 19/597; H04N 5/77
See application file for complete search history.

(56) References Cited

U.S. PATENT DOCUMENTS

| 2004/0179600 A1* | 9/2004 | Wells | ................... H04N 19/436 375/240.12 |
| 2012/0229603 A1* | 9/2012 | Bruls | ..................... H04N 19/21 348/43 |

(Continued)

FOREIGN PATENT DOCUMENTS

| JP | 2007-520107 A | 7/2007 |
| JP | 2010-521879 A | 6/2010 |

(Continued)

OTHER PUBLICATIONS

International Search Report of corresponding PCT Application No. PCT/KR2018/014569—4 pages (Jul. 19, 2019).

(Continued)

*Primary Examiner* — Thai Q Tran
*Assistant Examiner* — Sunghyoun Park
(74) *Attorney, Agent, or Firm* — Knobbe Martens Olson & Bear LLP

(57) ABSTRACT

Disclosed are a video conversion apparatus and a system for generating a 360-degree VR video in real time. The video conversion apparatus includes an input unit and a controller. The input unit receives a plurality of pieces of video information having continuity from a video recording apparatus including a plurality of cameras. The controller captures the plurality of pieces of video information received from the input unit, encodes the captured pieces of video (Continued)

information in a parallel structure, and stitches the encoded pieces of video information to generate a 360-degree VR video.

5 Claims, 12 Drawing Sheets

(51) Int. Cl.
*H04N 19/597* (2014.01)
*H04N 19/436* (2014.01)

(56) References Cited

U.S. PATENT DOCUMENTS

| | | | |
|---|---|---|---|
| 2017/0053675 A1* | 2/2017 | Dickerson | G11B 27/036 |
| 2018/0089903 A1* | 3/2018 | Pang | H04N 5/2258 |
| 2019/0230283 A1* | 7/2019 | Ollier | H04N 5/2254 |

FOREIGN PATENT DOCUMENTS

| | | |
|---|---|---|
| KR | 10-2013-0011951 A | 1/2013 |
| KR | 10-2016-0013263 A | 2/2016 |
| KR | 10-2017-0086203 A | 7/2017 |
| WO | 2007-083579 A1 | 7/2007 |

OTHER PUBLICATIONS

Choi et al., "Stereo 360 VR Video capture system design," JCCI 2018—4 pages.

* cited by examiner

VIDEO CONVERSION APPARATUS AND SYSTEM FOR GENERATING 360-DEGREE VIRTUAL REALITY VIDEO IN REAL TIME

CROSS REFERENCE TO RELATED APPLICATIONS

This is a continuation application of International Patent Application No. PCT/KR2018/014569, filed on Nov. 23, 2018, which claims priority to Korean patent application No. 10-2018-0128195 filed on Oct. 25, 2018, contents of both of which are incorporated herein by reference in their entireties.

BACKGROUND

Technical Field

The present disclosure generally relates to a video processing technology and, more particularly, to a video conversion apparatus and system for generating a 360-degree VR video in real time by converting in real time a plurality of videos into 360-degree VR video that is identifiable in all directions.

Description of Related Technology

In recent years, virtual reality (VR) technology has emerged as an interesting issue in the information and communications technologies (ICT) industry, and many information technology (IT) companies have studied and developed various VR devices.

SUMMARY

In order to realize contents for VR experience, 360-degree VR video technology has been developed to produce a multi-view panoramic video by combining consecutive videos obtained from multiple viewpoints. This allows a user to enjoy such videos at various viewpoints.

However, the currently developed 360-degree VR video technology has a drawback of requiring a long time to convert large-sized videos into a 360-degree VR video, thereby failing to realize a panoramic video in real time.

An object of the present disclosure is to provide a video conversion apparatus and system for generating in real time a 360-degree VR video identifiable in all directions by processing a plurality of videos in real time.

In order to accomplish the above object, the present disclosure provides a video conversion apparatus for generating a 360-degree VR video in real time. The apparatus includes an input unit and a controller. The input unit receives a plurality of pieces of video information having continuity from a video recording apparatus including a plurality of cameras. The controller captures the plurality of pieces of video information received from the input unit, encodes the captured pieces of video information in a parallel structure, and stitches the encoded pieces of video information to generate a 360-degree VR video.

In addition, the controller includes a frame capture unit recording a first frame for each camera in the plurality of pieces of video information, a frame encoder unit encoding the recoded raw frame for each camera and muxing (multiplexing) the encoded raw frame, thereby encoding the video information, and a video stitching unit calibrating the encoded video information and stitching the calibrated video information, thereby generating the 360-degree VR video.

In addition, the frame capture unit records the first frames for the respective cameras by using a recording concurrent queue.

In addition, the frame capture unit captures frames of the video information by using capture cards, and the frame encoder unit encodes the raw frame by using an encoder and muxes the encoded raw frame by using fast forward motion picture expert group (MPEG) (FFMPEG).

In addition, when recording a raw frame of the video information is completed, the frame encoder unit starts to encode the raw frame and simultaneously controls recording a raw frame of new video information to start.

In addition, the frame encoder unit includes a plurality of encoders, each of the plurality of encoders encodes a raw frame corresponding to a specific camera, the raw frames encoded for the respective cameras are classified, and the muxing is performed according to the classified raw frames.

In addition, the plurality of encoders includes a first encoder encoding raw frames corresponding to first and fourth cameras, a second encoder encoding raw frames corresponding to second and fifth cameras, and a third encoder encoding raw frames corresponding to third and sixth cameras.

In addition, the video stitching unit performs calibration such that the encoded video information is continuously connected to form a panoramic video.

The present disclosure provides a video conversion system that includes a video recording apparatus generating a plurality of pieces of video information having continuity with respect to 360 degrees, and a video conversion apparatus receiving the plurality of pieces of video information from the video recording apparatus and generating a 360-degree VR video by processing in real time the plurality of pieces of video information. The video conversion apparatus includes an input unit receiving the plurality of pieces of video information, and a controller capturing the plurality of pieces of video information received from the input unit, encoding the captured pieces of video information in a parallel structure, and stitching the encoded pieces of video information to generate the 360-degree VR video.

In addition, the video recording apparatus includes a camera unit including a plurality of cameras, acquiring a plurality of videos through the plurality of cameras, and generating video information about the plurality of acquired videos, and a support unit fixing the plurality of cameras at regular intervals of angle and supporting the plurality of cameras to take videos while being parallel to ground.

The video conversion apparatus and system can generate a 360-degree VR video in real time by performing image processing in a parallel structure through an encoding process and a stitching process. Therefore, a user can enjoy the high-quality 360-degree VR video in real time while being deeply immersed in content.

DETAILED DESCRIPTION

Figure 1:
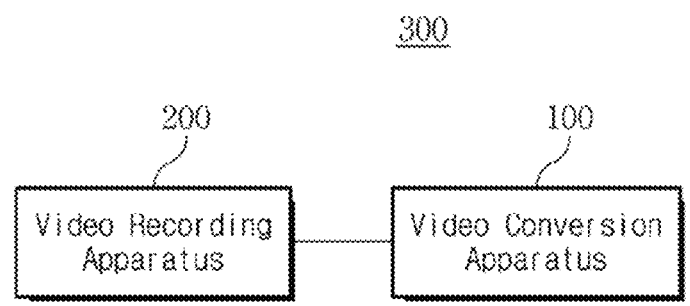
FIG. 1 is a schematic block diagram illustrating a video conversion system according to an embodiment of the present invention.

Hereinafter, embodiments of the present invention will be described in detail with reference to the accompanying drawings. In the drawings and descriptions, the same or corresponding elements are denoted by the same reference numerals. Also, in describing embodiments of the present invention, techniques that are well known in the art will not be described. This is to avoid obscuring the subject matter of the present invention by omitting an unnecessary explanation.

Figure 2A:
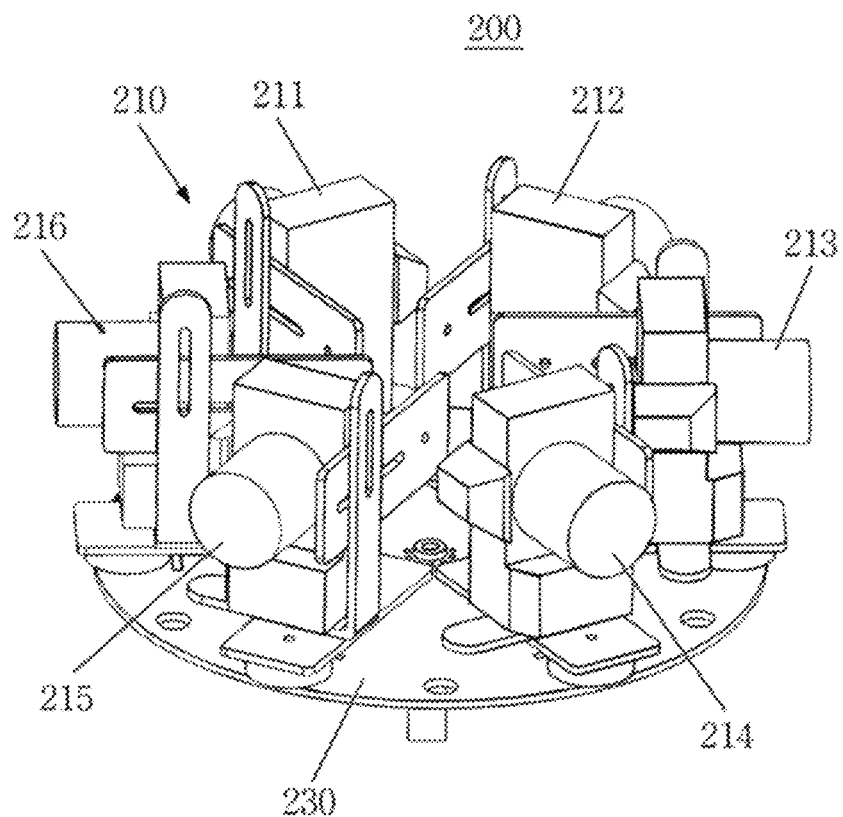
FIG. 2A and FIG. 2B show a video recording apparatus according to an embodiment of the present invention.
Figure 2B:
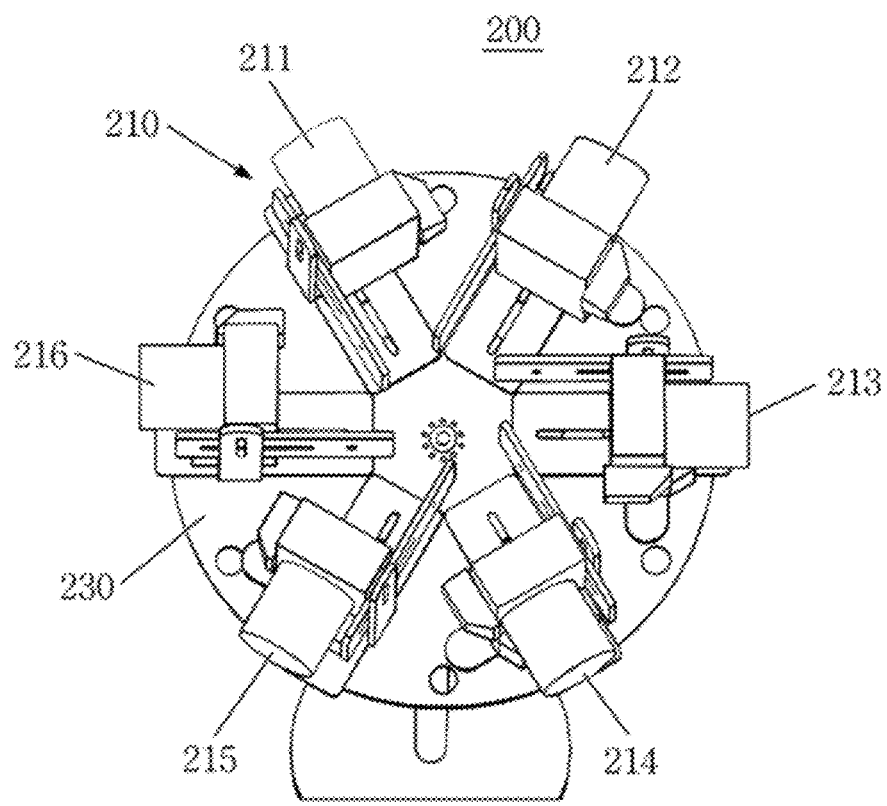
Figure 3:
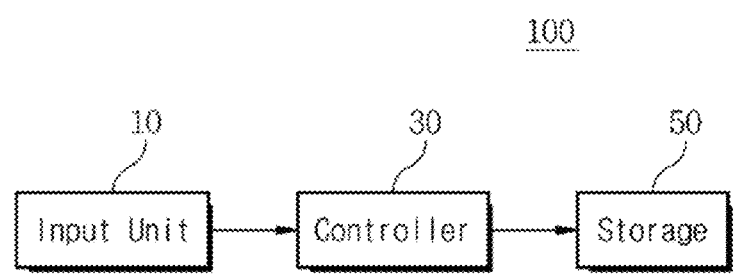
FIG. 3 is a block diagram illustrating a video conversion apparatus according to an embodiment of the present invention.
Figure 4:
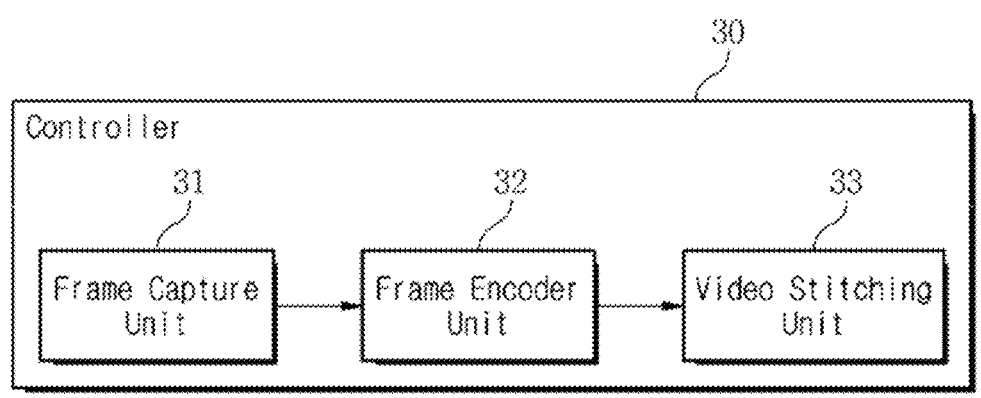
FIG. 4 is a block diagram illustrating the controller shown in FIG. 3.

FIG. 1 is a schematic block diagram illustrating a video conversion system according to an embodiment of the present invention, and FIG. 2A and FIG. 2B are a perspective view illustrating a video recording apparatus according to an embodiment of the present invention. Also, FIG. 3 is a block diagram illustrating a video conversion apparatus according to an embodiment of the present invention, and FIG. 4 is a block diagram illustrating the controller shown in FIG. 3. In FIG. 2A is a perspective view showing the video recording apparatus from one direction, and FIG. 2B is a perspective view showing the video recording apparatus from another direction.

Referring to FIGS. 1 to 4, a video conversion system 300 generates a 360-degree VR video, which is identifiable in all directions, by processing a plurality of videos in real time. The 360-degree VR video may be a 4K stereo video. The video conversion system 300 includes a video conversion apparatus 100 and a video recording apparatus 200.

The video recording apparatus 200 generates a plurality of pieces of video information having continuity with respect to 360 degrees. The video recording apparatus 200 includes a camera unit 210 and a support unit 230.

The camera unit 210 includes a plurality of cameras 211, 212, 213, 214, 215, and 216. The camera unit 210 acquires a plurality of videos through the plurality of cameras 211, 212, 213, 214, 215, and 216, and generates video information about the plurality of acquired videos. The plurality of cameras 211, 212, 213, 214, 215, and 216 may be cameras of the same type such as, for example, cameras equipped with a full-frame image sensor.

The support unit 230 fixes and supports the camera unit 210. Specifically, the support unit 230 fixedly supports the plurality of cameras 211, 212, 213, 214, 215, and 216 at regular intervals of angle. That is, on the support unit 230, a first camera 211, a second camera 212, a third camera 213, a fourth camera 214, a fifth camera 215, and a sixth camera 216 are disposed to sequentially cover 360 degrees at regular angle intervals. Also, the support unit 230 is adjustable to be level so that the plurality of cameras 211, 212, 213, 214, 215, and 216 can acquire videos while being parallel to the ground. The support unit 230 may be composed of a circular plate for fixedly supporting the plurality of cameras 211, 212, 213, 214, 215, and 216 at regular angle intervals and a vertical support fastened to the circular plate and being upright on the ground. Preferably, the vertical support may be a tripod capable of stably bearing the load of the cameras 211, 212, 213, 214, 215, and 216.

Although it is illustrated that the camera unit 210 has six cameras, the number of cameras may be varied according to the usage environment.

The video conversion apparatus 100 generates a 360-degree VR video by processing in real time a plurality of pieces of video information generated at the camera unit 210. The video conversion apparatus 100 includes an input unit 10, a controller 30, and a storage 50.

The input unit 10 receives the plurality of pieces of video information having continuity from the camera unit 210. The input unit 10 may individually receive each piece of video information from each of the cameras 211, 212, 213, 214, 215, and 216.

The controller 30 captures the plurality of pieces of video information received from the input unit 10 and encodes the captured pieces of video information in a parallel structure. Then, the controller 30 generates a 360-degree VR video by stitching the encoded pieces of video information. The controller 30 includes a frame capture unit 31, a frame encoder unit 32, and a video stitching unit 33.

The frame capture unit 31 captures frames by recording the first frame for each camera in the plurality of pieces of video information. At this time, the frame capture unit 31 may capture frames of video information by using capture cards. The frame capture unit 31 may record the first frames for the respective cameras by using a recording concurrent queue.

The frame encoder unit 32 encodes raw frames recorded at the frame capture unit 31 for the respective cameras and muxes the encoded raw frames. Hereinafter, such encoding and muxing processes may be shortly referred to as an encoding process of video information. The frame encoder unit 32 may encode a raw frame by using an encoder and mux the encoded raw frame by using FFMPEG. Here, the encoder is Nvidia HW Encoder, and FFMPEG is a computer program for recording and converting digital audio and video streams in the form of various types. In particular, the frame encoder unit 32 encodes video information in a parallel structure. That is, when recording a certain raw frame of video information is completed, the frame encoder unit 32 starts to encode the raw frame and simultaneously controls recording a raw frame of new video information to start. To this end, the frame encoder unit 32 includes a plurality of encoders, which perform operations in parallel. Therefore, before image processing for one sequence is completed, the frame encoder unit 32 can perform image processing for the next sequence, thereby reducing an operation time without concentrating the operation into one encoder. This can also prevent the overload caused by the operation.

The video stitching unit 33 calibrates the video information encoded at the frame encoder unit 32. That is, the video stitching unit 33 performs calibration such that the encoded pieces of video information can be continuously connected to form a panoramic video. The video stitching unit 33 generates a 360-degree VR video by stitching the calibrated video information. At this time, the video stitching unit 33 may perform stitching by using a config extensible markup language (XML) file. The config XML file may include a calibrated config XML file, a video config XML file, and a stitcher config XML file.

The storage 50 stores the plurality of pieces of video information received from the video recording apparatus 200. In addition, the storage 50 stores the 360-degree VR video generated at the controller 30. Also, the storage 50 stores a program for generating the 360-degree VR video by processing the plurality of pieces of video information. The storage 70 may include at least one of a flash memory type storage, a hard disk type storage, a multimedia card micro type storage, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

Figure 5:
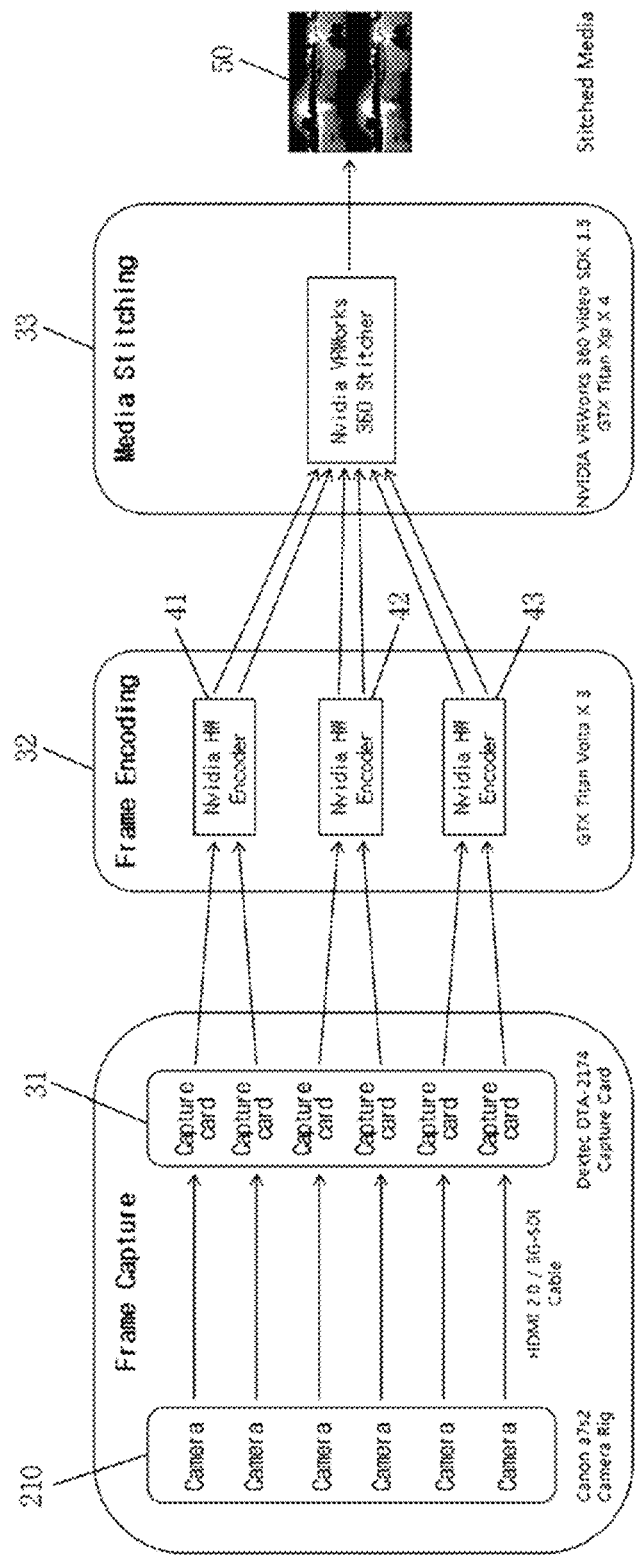
FIG. 5 is a diagram illustrating a process performed by a video conversion system according to an embodiment of the present invention.
Figure 6:
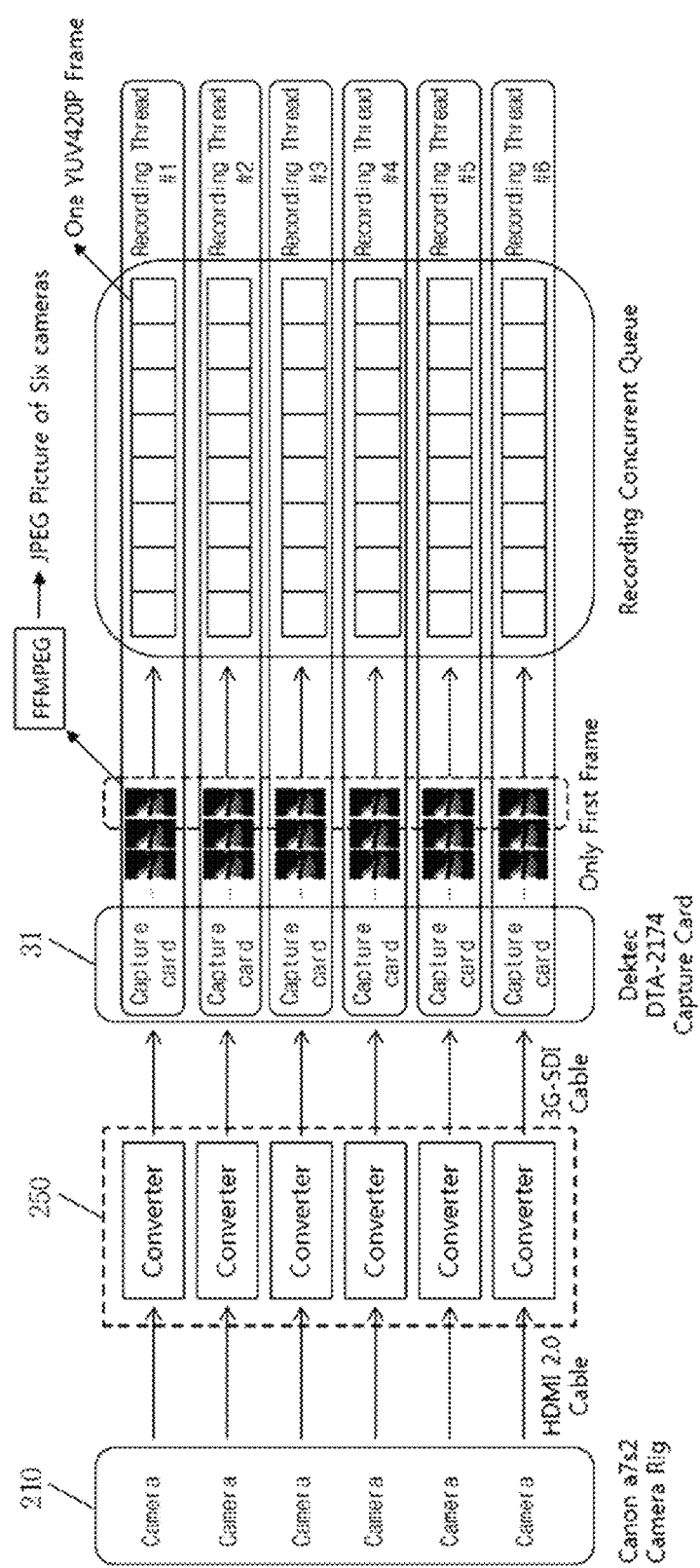
FIG. 6 is a diagram illustrating a frame capture process according to an embodiment of the present invention.
Figure 7:
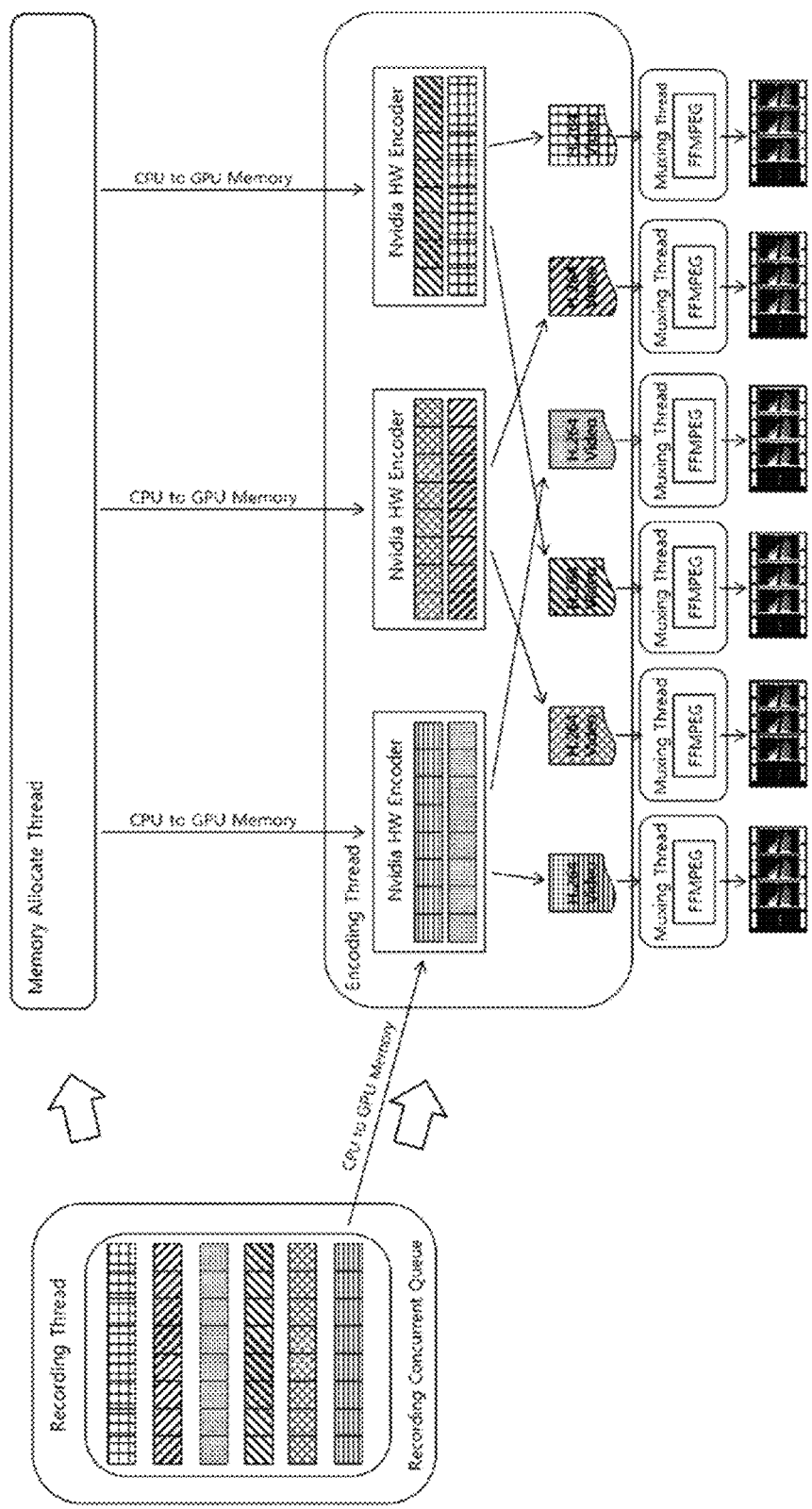
FIG. 7 is a diagram illustrating a frame encoding process according to an embodiment of the present invention.
Figure 8:
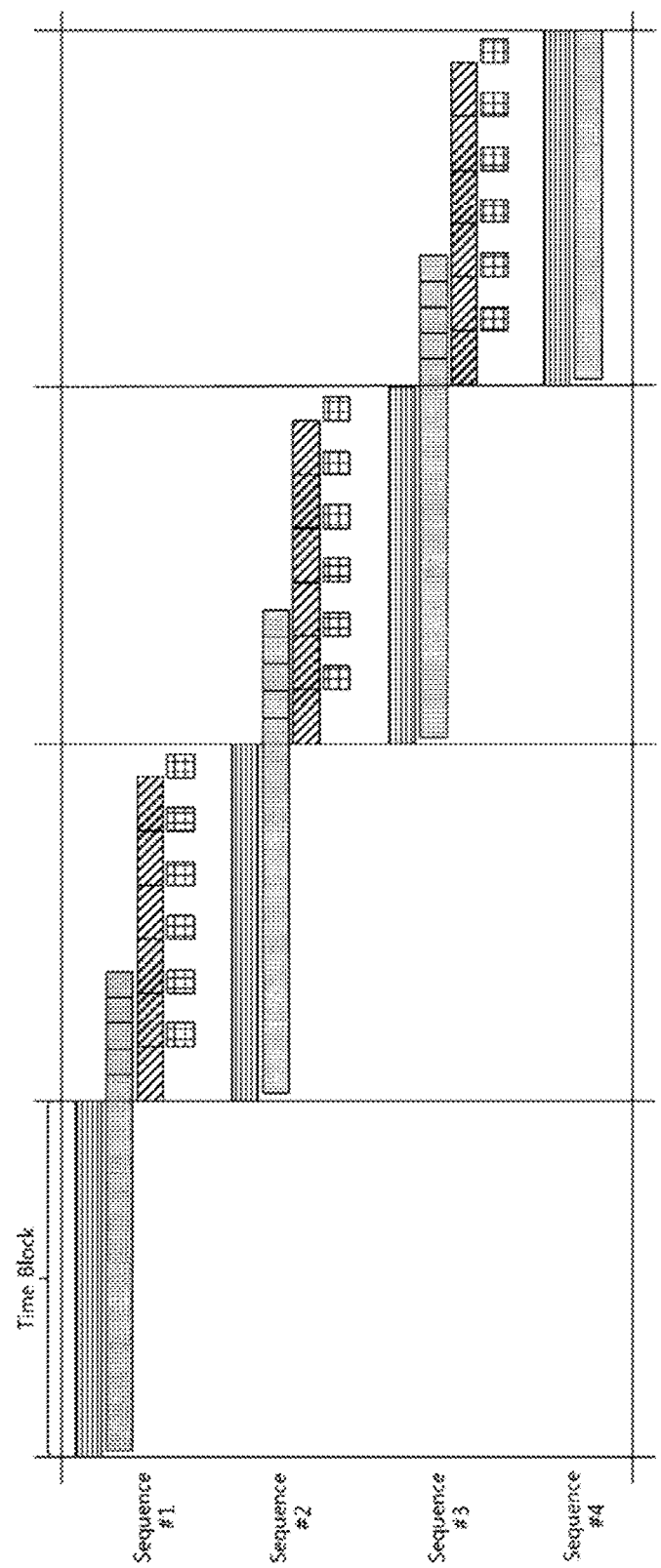
FIG. 8 is a diagram illustrating the frame encoding process of FIG. 7 on the basis of a time block.
Figure 9:
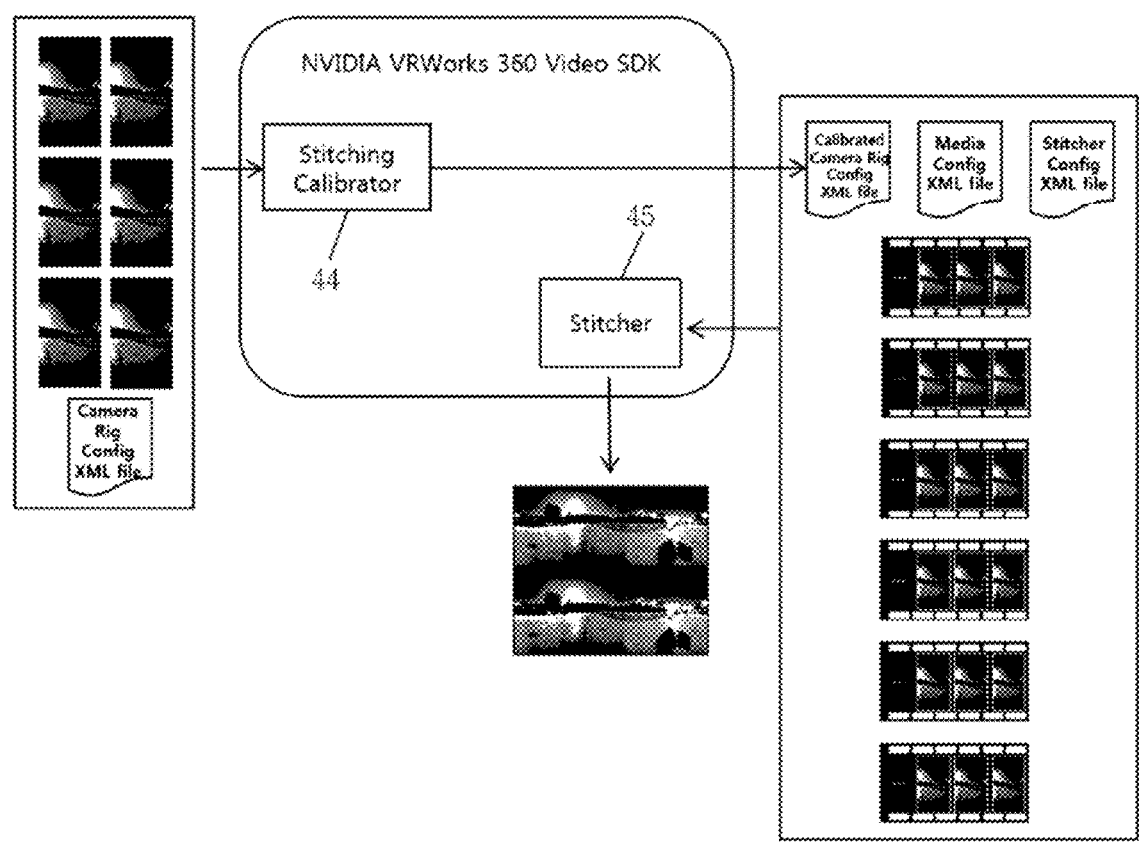
FIG. 9 is a diagram illustrating a video stitching process according to an embodiment of the present invention.
Figure 10:
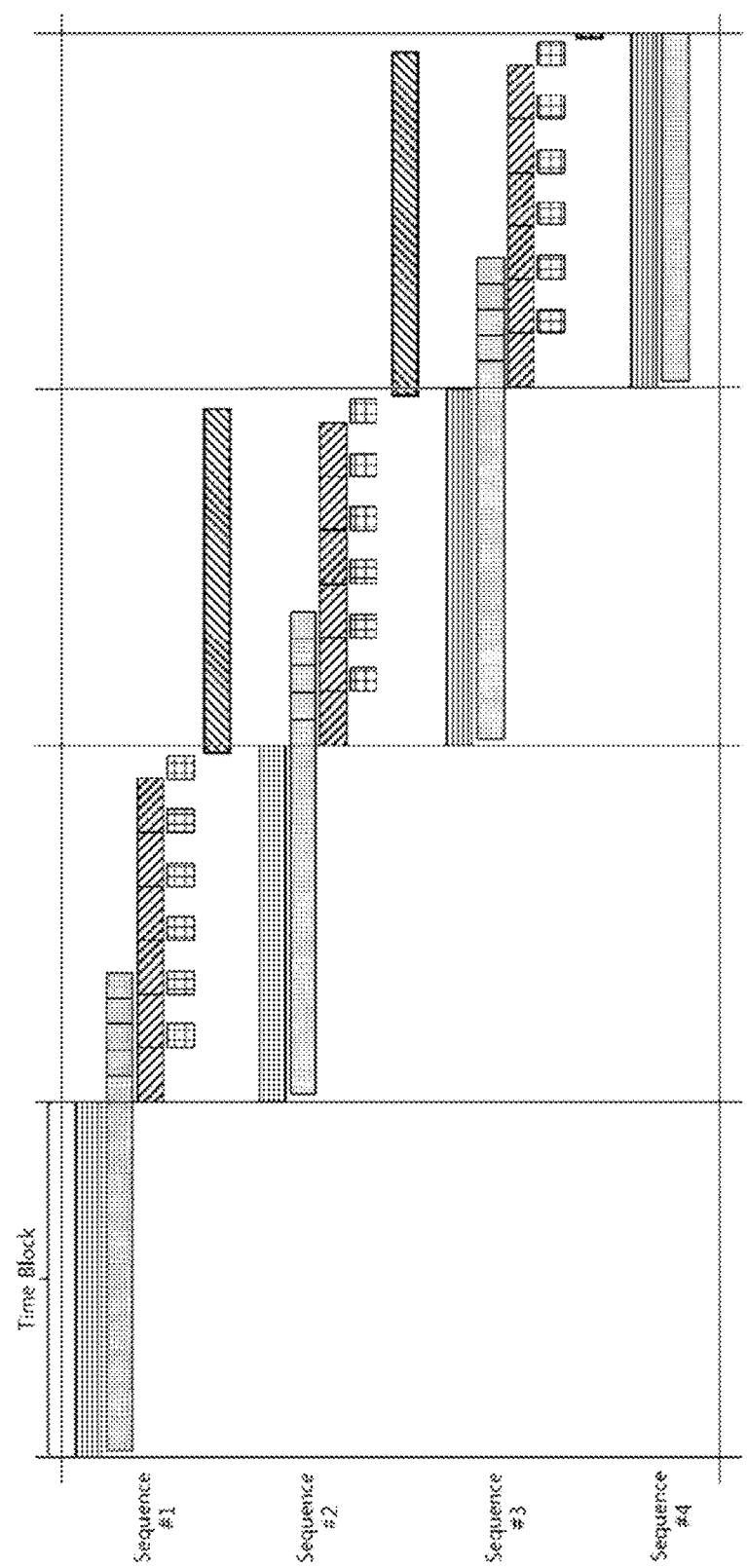
FIG. 10 is a diagram illustrating the video stitching process of FIG. 9 on the basis of a time block.
Figure 11A:
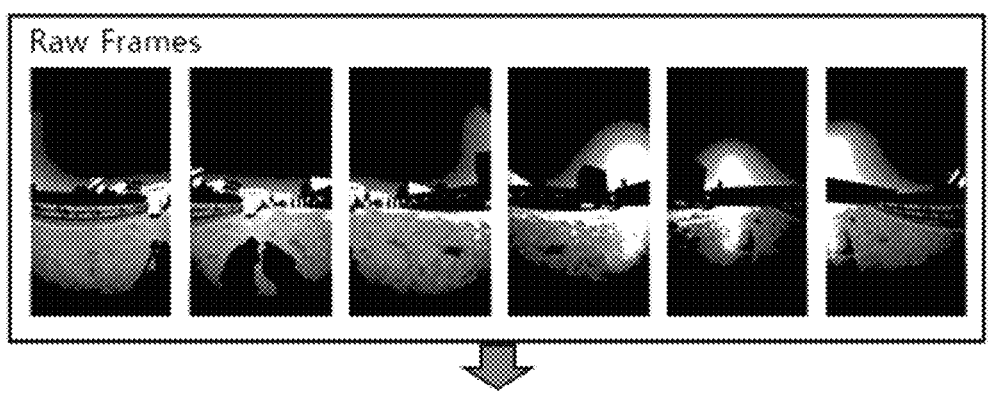
FIG. 11A, FIG. 11B and FIG. 11C show a process of generating a 360-degree VR video according to an embodiment of the present invention.
Figure 11B:
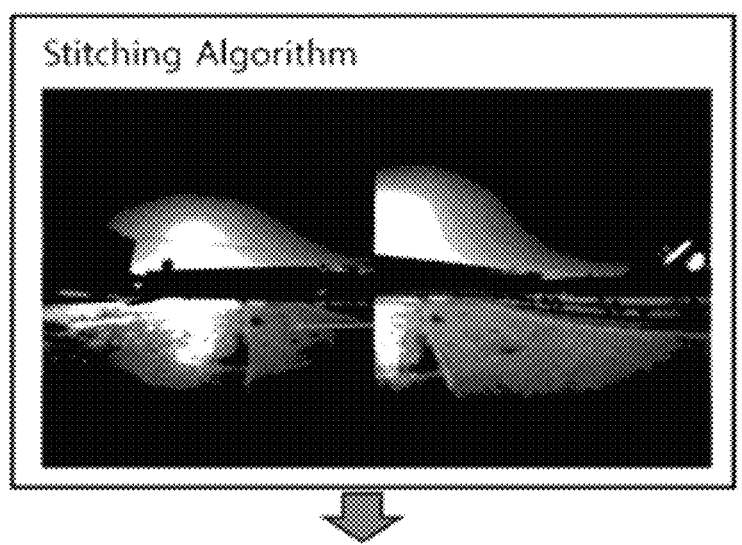
Figure 11C:
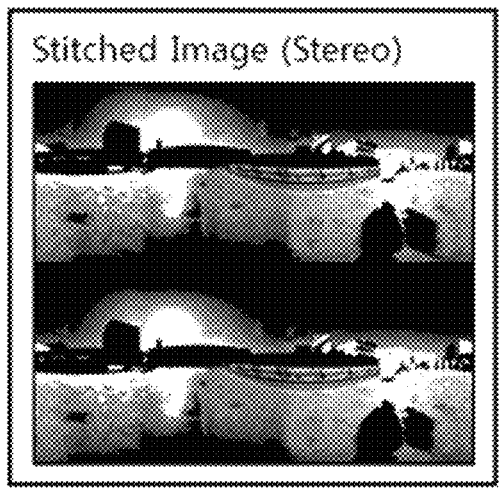

FIG. 5 is a diagram illustrating a process performed by a video conversion system according to an embodiment of the present invention, and FIG. 6 is a diagram illustrating a frame capture process according to an embodiment of the present invention. FIG. 7 is a diagram illustrating a frame encoding process according to an embodiment of the present invention, and FIG. 8 is a diagram illustrating the frame encoding process of FIG. 7 on the basis of a time block. FIG. 9 is a diagram illustrating a video stitching process according to an embodiment of the present invention, and FIG. 10 is a diagram illustrating the video stitching process of FIG. 9 on the basis of a time block. FIG. 11A-FIG. 11C are a diagram illustrating a process of generating a 360-degree VR video according to an embodiment of the present invention.

Referring to FIG. 5 to FIG. 11C, the video conversion system 300 may generate a 360-degree VR video from a plurality of videos in real time by performing image processing in a parallel structure through the encoding process and the stitching process. Therefore, a user can enjoy the high-quality 360-degree VR video in real time while being deeply immersed in content. Specifically, the video conversion system 300 may generate the 360-degree VR video as follows.

At the outset, the camera unit 210 acquires a plurality of videos through a plurality of cameras and inputs the plurality of acquired videos to the frame capture unit 31. The frame capture unit 31 captures a frame of the acquired video of each camera, based on the plurality of inputted videos, and transmits the captured frames to the frame encoder unit 32. The frame encoder unit 32 encodes the captured frames and transmits the encoded frames to the video stitching unit 33. The video stitching unit 33 stitches the encoded frames to generate a 360-degree VR video and transmits the generated 360-degree VR video to the storage 50. The storage 50 stores the 360-degree VR video.

Specifically, the camera unit 210 acquires a plurality of videos through a plurality of cameras and transmits the acquired videos to the frame capture unit 31 through a high-definition multimedia interface (HDMI) cable and a 3G-serial digital interface (3G-SDI) cable. At this time, the acquired videos are transmitted individually for the respective cameras and digitized through a converter 250 provided between the HDMI cable and the 3G-SDI cable.

The frame capture unit 31 captures the first frame of each video acquired by each camera. For example, the frame capture unit 31 captures through a first capture card a frame from video information generated by the first camera 211, captures through a second capture card a frame from video information generated by the second camera 212, captures through a third capture card a frame from video information generated by the third camera 213, captures through a fourth capture card a frame from video information generated by the fourth camera 214, and captures through a fifth capture card a frame from video information generated by the fifth camera 215. The frame capture unit 31 records the captured first frames and transmits the recorded raw frames to the frame encoder unit 32. At this time, the frame capture unit 31 may perform recording by using the recording concurrent queue.

The frame encoder unit 32 encodes the recorded raw frames for the respective cameras. To do this, the frame encoder unit 32 includes a plurality of encoders 41, 42, and 43. Each of the plurality of encoders 41, 42, and 43 encodes the raw frame corresponding to a specific camera, and the raw frames encoded for the respective cameras are classified. The classified raw frames are muxed through the FFMPEG, and thereby encoding of the video information is completed. For example, the first encoder 41 may encode raw frames corresponding to the first and fourth cameras, the second encoder 42 may encode raw frames corresponding to the second and fifth cameras, and the third encoder 43 may encode raw frames corresponding to the third and sixth cameras. The encoded raw frames are classified and muxed for each camera through the FFMPEG.

That is, the frame encoder unit 32 may encode raw frames by using encoders and then mux the encoded raw frames by using the FFMPEG. When recording a raw frame of video information is completed, the frame encoder unit 32 may start to encode the raw frame. At the same time, the frame encoder unit 32 may control recording a raw frame of new video information to start. That is, the frame encoder unit 32 may perform the encoding process in a parallel structure. The frame encoder unit 32 transmits the encoded video information to the video stitching unit 33. In addition, the frame encoder unit 32 may allocate and store the encoded raw frame to and in the storage 70.

The video stitching unit 33 calibrates video information encoded at the frame encoder unit 32 and generates a 360-degree VR video by stitching the calibrated video information. To do this, the video stitching unit 33 includes a stitching calibrator 44 and a stitcher 45. The stitching calibrator 44 performs calibration such that the encoded video information can be continuously connected to form a panoramic video. At this time, the stitching calibrator 44 generates a calibrated config XML file by using a camera rig config XML file and six calibration JPEG pictures. The stitcher 45 performs stitching by using the calibrated config XML file generated at the stitching calibrator 44, a video config XML file, a stitcher config XML file, and six stitching videos.

Thus, as shown in FIG. 11A to FIG. 11C, the video conversion system 300 can encode raw frames (see FIG. 11A) acquired by the video recording apparatus 200, stitch the encoded frames through a stitching algorithm (see FIG. 11B), and generate in real time a 4K stereo 360-degree VR video (see FIG. 11C).

While the present invention has been particularly shown and described with reference to some embodiments thereof, it will be understood by those skilled in the art that various changes in form and details may be made therein without departing from the scope of the present invention as defined by the appended claims.

What is claimed is:

1. A video conversion apparatus for generating a 360-degree virtual reality (VR) video in real time, the apparatus comprising:

an input unit configured to receive a plurality of pieces of video information having continuity from a video recording apparatus including a plurality of cameras, wherein the plurality of cameras comprise a first camera and a second camera facing opposing directions and a third camera and a fourth camera facing opposing directions; and a controller configured to capture the plurality of pieces of video information received from the input unit, encode the plurality of pieces of video information in a parallel structure, and stitch the plurality of pieces of video information to generate a 360-degree VR video, wherein the controller comprises:
   a frame capture unit comprising a plurality of frame capture cards that are configured to capture the plurality of pieces of video information received from the plurality of cameras, each frame capture card being configured to capture one piece of video information received from a corresponding one of the plurality of cameras,
   a frame encoder unit comprising a plurality of encoders that are configured to encode the plurality of pieces of video information captured by the plurality of frame capture cards of the frame capture unit, wherein the plurality of encoders comprise a first encoder and a second encoder, wherein the first encoder is configured to encode first pieces of video information received from the first and second cameras, wherein the second encoder is configured to encode second pieces of video information received from the third and fourth cameras, and
   a video stitching unit configured to calibrate the plurality of pieces of video information processed by the plurality of encoders of the frame encoder unit, and stitch the plurality of pieces of video information so as to generate the 360-degree VR video.

2. The apparatus of claim 1, wherein the plurality of cameras of the video recording apparatus further comprise fifth and sixth cameras facing opposing directions, wherein the plurality of encoders of the frame encoder unit further comprise a third encoder, and
   wherein the third encoder is configured to encode third pieces of video information received from the fifth and sixth cameras.

3. The apparatus of claim 1, wherein the video stitching unit is configured to perform calibration such that the encoded video information is continuously connected to form a panoramic video.

4. A video conversion system comprising:
   the video conversion apparatus of claim 1; and
   a video recording apparatus configured to generate the plurality of pieces of video information having continuity with respect to 360 degrees and provide the generated plurality of pieces of video information to the video conversion apparatus.

5. The system of claim 4, wherein the video recording apparatus includes:
   a camera unit including the plurality of cameras; and
   a support unit configured to fix the plurality of cameras at regular intervals of angle and support the plurality of cameras to take videos while being parallel to ground.

* * * * *